(12) United States Patent
Matthys et al.

(10) Patent No.: US 11,946,659 B2
(45) Date of Patent: Apr. 2, 2024

(54) REMOTE AUTOMATED DEPLOYMENT OF HVAC OPTIMIZATION SOFTWARE

(71) Applicant: OPTIMUM ENERGY, LLC, Seattle, WA (US)

(72) Inventors: Clark Richard Matthys, Maple Valley, WA (US); Ian Robert Dempster, Seattle, WA (US); Peng Chen, Kenmore, WA (US); Chris Carter, Wenatchee, WA (US); Chris Boscolo, Bellevue, WA (US); Andrew Alexander Lechner, Kent, WA (US)

(73) Assignee: OPTIMUM ENERGY, LLC, Seattle, WA (US)

( * ) Notice: Subject to any disclaimer, the term of this patent is extended or adjusted under 35 U.S.C. 154(b) by 136 days.

(21) Appl. No.: 16/770,449

(22) PCT Filed: Dec. 7, 2017

(86) PCT No.: PCT/US2017/065124
§ 371 (c)(1),
(2) Date: Jun. 5, 2020

(87) PCT Pub. No.: WO2019/112592
PCT Pub. Date: Jun. 13, 2019

(65) Prior Publication Data
US 2020/0386428 A1 Dec. 10, 2020

(51) Int. Cl.
*F24F 11/48* (2018.01)
*F24F 11/30* (2018.01)
*F24F 11/46* (2018.01)
*F24F 11/54* (2018.01)
*F24F 11/58* (2018.01)
(Continued)

(52) U.S. Cl.
CPC .............. *F24F 11/30* (2018.01); *F24F 11/46* (2018.01); *F24F 11/54* (2018.01); *F24F 11/58* (2018.01);
(Continued)

(58) Field of Classification Search
None
See application file for complete search history.

(56) References Cited

U.S. PATENT DOCUMENTS

| 5,535,814 A | 7/1996 | Hartman |
| 6,185,946 B1 | 2/2001 | Hartman |

(Continued)

FOREIGN PATENT DOCUMENTS

| CN | 102193527 A | 9/2011 |
| WO | 2011106918 A1 | 9/2011 |

OTHER PUBLICATIONS

International Search Report and Written Opinion for PCT/US2017/065124, dated Aug. 6, 2018, 10 pages.
(Continued)

*Primary Examiner* — Kenneth M Lo
*Assistant Examiner* — Istiaque Ahmed
(74) *Attorney, Agent, or Firm* — Seed IP Law Group LLP

(57) ABSTRACT

Computer-implemented methods and structures deploy a heating ventilation and air conditioning (HVAC) energy optimization program. A standard operating control platform (OCP) is deployed in an energy optimization control engine (EOCE) computing system communicatively coupled to a plurality of HVAC components via a building automation system (BAS). An energy optimization portal (EOP), which receives from the EOCE computing system a first data set identifying the plurality of HVAC components, a second data set including operational control parameters for each of the plurality of HVAC components, and a third data set including measured operations data associated with each of the plurality of HVAC components. The EOP generates an energy optimized operating control platform based on the
(Continued)

first, second, and third data sets, which is automatically communicated from the EOP to the EOCE computing system.

20 Claims, 5 Drawing Sheets

(51) Int. Cl.
*F24F 11/64* (2018.01)
*F24F 11/65* (2018.01)
*G05B 19/042* (2006.01)
*F24F 110/00* (2018.01)
*F24F 130/10* (2018.01)

(52) U.S. Cl.
CPC ............. *F24F 11/64* (2018.01); *F24F 11/65* (2018.01); *G05B 19/042* (2013.01); *F24F 2110/00* (2018.01); *F24F 2130/10* (2018.01); *G05B 2219/2614* (2013.01)

(56) References Cited

U.S. PATENT DOCUMENTS

| | | |
|---|---|---|
| 8,219,250 B2 | 7/2012 | Dempster et al. |
| 2013/0227126 A1* | 8/2013 | Imes ................... H04L 41/0813 709/224 |
| 2014/0277761 A1 | 9/2014 | Matsouka et al. |
| 2015/0045964 A1* | 2/2015 | Dempster ........... H04L 12/2803 700/276 |
| 2015/0276254 A1* | 10/2015 | Nemcek ................... F24F 11/58 700/278 |
| 2015/0292763 A1 | 10/2015 | Jung et al. |
| 2016/0084515 A1* | 3/2016 | Sato ....................... G05B 15/02 700/278 |
| 2016/0187896 A1* | 6/2016 | Jones .................. H04L 12/2816 700/276 |
| 2016/0327296 A1* | 11/2016 | Leising ................... H04L 67/02 |
| 2017/0212487 A1* | 7/2017 | Gupta ...................... F24F 11/62 |
| 2017/0241661 A1 | 8/2017 | Erpelding et al. |
| 2018/0121190 A1* | 5/2018 | Atchison ................... G06F 8/65 |
| 2021/0080915 A1* | 3/2021 | Yan .......................... F24F 11/46 |

OTHER PUBLICATIONS

International Preliminary Report on Patentability, dated Jun. 9, 2020, for Patent No. PCT/US2017/065124. (7 pages).
Office Action, dated Dec. 6, 2023, for Canadian Patent Application No. 3,082,781. (4 pages).

* cited by examiner

REMOTE AUTOMATED DEPLOYMENT OF HVAC OPTIMIZATION SOFTWARE

BACKGROUND

Technical Field

The present disclosure generally relates to heating, ventilation, and air conditioning (HVAC) optimization software. More particularly, but not exclusively, the present disclosure relates to remote, automatic download and activation of HVAC optimization software.

Description of the Related Art

Systems that heat, ventilate, and cool buildings are expensive to install and operate. Heating, ventilation, and air conditioning (HVAC) systems can in many cases be deliberately operated to improve efficiency. In these cases, a control device takes input from environmental sensors, occupancy sensors, and people, and then based on the input, the control device can direct the operations of the HVAC system. Operating the HVAC system efficiently can provide ongoing cost savings when less energy is used to provide a sufficient level of HVAC comfort. Operating the HVAC system efficiently can also provide additional savings by extending the life of one or more components of the HVAC system when the components are used less frequently or at less than their full capability. Some aspects of technologies and related art that may be useful to an understanding of the present invention are taught in various patent publications.

U.S. Pat. No. 5,535,814 B2 to Hartman (i.e., the '814 patent) is entitled SELF-BALANCING VARIABLE AIR VOLUME HEATING AND COOLING SYSTEM. The '814 patent teaches a variable air volume heating and cooling system that provides automatic system-wide airflow balancing. To balance the '814 patent system, the maximum airflow setting of each terminal box is automatically and continuously adjusted in response to central supply fan loading conditions together with local zone conditions. The system taught in the '814 patent has the advantage of automating both initial air balancing of terminal units at the time of installation, as well as rebalancing to respond to changing conditions, without a human technician's intervention.

U.S. Pat. No. 6,185,946 B2 to Hartman (i.e., the '946 patent) is entitled SYSTEM FOR SEQUENCING CHILLERS IN A LOOP COOLING PLANT AND OTHER SYSTEMS THAT EMPLOY ALL VARIABLE-SPEED UNITS. The '946 patent builds on certain concepts taught in the '814 patent. In addition to providing deliberate control of individual HVAC systems, it is recognized that additional efficiency gains may be made by deliberately controlling parallel units in an HVAC system. For example, the '946 patent teaches improved methods of sequencing parallel centrifugal pumps in a variable flow hydronic system, parallel fans in a variable air-flow system, and centrifugal chillers in an HVAC system having a plurality of variable speed drive centrifugal chillers arranged in parallel. In at least some methods of the '946 patent, an operating point of the on-line units can be determined, the current operating point of the on-line units can be compared to a natural curve of maximum efficiency, and certain ones of the units can be added or released to move closest to an operating curve of optimal efficiency across the system.

In still further improvements in HVAC operating efficiency, certain discoveries have been made to permit individual HVAC components to operate more efficiently using real time data collection, real time efficiency prediction, and adaptation of future operation based on the data collection and efficiency prediction. U.S. Pat. No. 8,219,250 B2 (the '250 patent) to Dempster et al. is entitled SYSTEMS AND METHODS TO CONTROL ENERGY CONSUMPTION EFFICIENCY. In the '250 patent, a controller is configured to exchange information with a building automation system (BAS). The controller includes various executable programs for determining a real time operating efficiency, simulating a predicted or theoretical operating efficiency, and making adjustments to HVAC system operating parameters. In one method taught by the '250 patent, a BAS is used to control operating efficiency of an HVAC system. The method includes the acts of (1) exchanging information contemporaneously in time between a controller and the building automation system; (2) determining an operating efficiency of the HVAC system based on the present operating state of the equipment; (3) determining a predicted operating efficiency of the HVAC system computed from installation specifications provided with the HVAC equipment; (4) comparing whether the operating efficiency is below a desired threshold relative to the predicted operating efficiency; (5) adjusting one or more HVAC system operating parameters; (6) transmitting the one or more adjustments to the BAS; and (7) triggering a self-learning feature of the controller to automatically recall the adjustment at a later time when the operating efficiency is again below the desired threshold.

The disclosures here in the Background section are incorporated into the present disclosure by reference.

FIG. 1 is a conventional energy optimization HVAC system 10. A building automation system (BAS) 12 is arranged to control a plurality of HVAC components 34. For example, the BAS 12 in FIG. 1 is arranged to direct the operations of variable frequency drives (VFD) 14, tower fans 16, chillers 18, air handling units (AHU) 20, boilers 22, variable air volume (VAV) and constant air volume (CAV) air handler units 24, pumps and valves 26, and possibly other HVAC components that are not shown.

As indicated by two-headed pointers, the BAS 12 and ones of the plurality of HVAC components 34 may establish and maintain any one or more of unidirectional communications, bidirectional communications, wired communications, wireless communications, electromechanical communications, mechanical communications, or some combination thereof. Using the means of communicating, the BAS 12 may provide control signals, status signals, parameters, or other such data to the HVAC components 34, and in some cases, one or more of the HVAC components 34 may provide control signals, status signals, error signals, stored parameters, generated data, or other information to the BAS 12.

In the conventional energy optimization HVAC system 10, an energy optimization control engine (EOCE) 50 is communicatively coupled to the BAS 12. The EOCE 50 may provide control information to direct energy efficiency operations of the BAS 12 according to the '814 patent, the '946 patent, the '250 patent, or some other protocol.

Implementation of the conventional energy optimization HVAC system 10 is a process that requires several people. The people may include any one or more of building site owner/managers 28a, energy optimization provider representatives 28b, energy optimization engineers 28c, and others associated with a particular building or building site such as controls engineers, integration engineers, maintenance engineers, service engineers, and the like, which are referred to herein as building engineers 28d. Each of the people associated with the conventional energy optimization HVAC system 10 may have access to a user computing device 32. Via a wide area network (WAN) 30 such as the Internet and an associated user computing device 32, the people associated with the conventional energy optimization HVAC system 10 may communicate with each other and with others. In some cases, certain ones of those associated with the conventional energy optimization HVAC system 10 use a user computing device 32 to communicate with one or more of the EOCE 50, the BAS 12, and the plurality of HVAC components 34.

One operational use of the conventional energy optimization HVAC system 10 is now described. In this scenario, BAS 12 and the plurality of HVAC components 34 are installed in a building complex without an EOCE 50. The building site owner/manager 28a recognizes very high energy and maintenance costs in the building complex, and in an effort to reduce the energy and maintenance costs, the building site owner/manager 28a contacts an energy optimization provider representative 28b.

The energy optimization provider representative 28b engages help from the building site owner/manager 28a, an energy optimization engineer 28c, and a building engineer 28d. Using the BAS 12, the building engineer 28d collects certain data from the BAS 12 and any number of the plurality of HVAC components 34. The information, which may include "on" times, "off" times, alerts, temperature data, humidity data, air flow data, and other such information, is communicated to the energy optimization provider representative 28b. The collected information may be collected instantaneously as a "snapshot," or the information may be collected over hours, days, weeks, or months.

Using the collected building complex information provided by the building engineer 28d, the energy optimization engineer 28c creates a particular configuration of an EOCE 50, which is customized to the building complex and the installed BAS 12 and HVAC components 34. In some cases, the particular configuration may include hardware, software, or a combination of hardware and software. Once so customized, the EOCE 50 is delivered to the building complex and installed. The installation may be performed by the building engineer 28d, the energy optimization engineer 28c, others, or some combination of these. Presumably, once installed, the EOCE 50 will operate well and improve the energy usage of the building complex.

In some cases, the EOCE 50 is able to communicate, via the WAN 30, to provide information to the energy optimization provider representative 28b. This information may be provided automatically, manually, or by some other process. Using the communicated information, the energy optimization provider representative 28b, the energy optimization engineer 28c, or others are able to assess the energy optimization performance of the EOCE 50. Based on failures, if any, and further based on additional discovered optimizations or for other reasons, it may be determined that improvements can be made to the EOCE 50.

If it is determined that improvements are to be made to the EOCE 50, additional building data may be collected, and the energy optimization engineer 28c can generated a new configuration for EOCE 50. The new configuration may include new hardware, new software, or both new hardware and new software. And after being generated, the new configuration is delivered to the building complex and installed by the building engineer 28d, the energy optimization engineer 28c, others, or some combination of these.

Each time it is determined that improvements or other changes are to be made to the EOCE 50, the same time-intensive, expensive manual processes to collect data, generate a new configuration for EOCE 50, and install the new configuration are followed.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Due to the critical benefits that heating ventilation and air conditioning (HVAC) equipment provides for people and property, and the inability to tolerate a loss of equipment operation, the installation and activation of an HVAC energy optimization control system has conventionally been expensive and time-consuming. The conventional process requires a substantial amount of onsite manual data collection followed by a substantial amount of offsite software programming and configuration. Later, in the conventional process, the energy optimization control systems that have been custom developed for a particular site are manually deployed at the building site where the HVAC equipment operates.

Problems with the conventional means to develop and deploy HVAC energy optimization controllers are solved with the systems and methods described herein. Embodiments of these systems and methods provide for the automatic collection of building data, the automatic generation of customized energy optimization programming, and the automatic push deployment of said programming.

In a first embodiment, a computer-implemented method to deploy a heating ventilation and air conditioning (HVAC) optimization program includes providing a standard operating control platform in an energy optimization control engine (EOCE) computing system. The EOCE computing system is communicatively coupled to a building automation system (BAS) that directs operations of a plurality of HVAC components. In the method, one or more configured computing systems of an energy optimization portal (EOP) receive data from the EOCE computing system. The data includes a first data set identifying the plurality of HVAC components, a second data set including operational control parameters for each of the plurality of HVAC components, and a third data set including measured operations data associated with each of the plurality of HVAC components. Based on the first, second, and third data sets, the one or more configured computing systems of the EOP generates an energy optimized operating control platform. The energy optimized operating control platform is arranged to cooperatively control each of the plurality of HVAC components via directives passed from the EOCE computing system to the BAS. Once generated, the energy optimized operating control platform is communicated from the one or more configured computing systems of the EOP to the EOCE computing system.

A computer-implemented method to deploy a heating ventilation and air conditioning (HVAC) energy optimization program may be summarized as including providing a standard operating control platform in an energy optimization control engine (EOCE) computing system, the EOCE computing system communicatively coupled to a building automation system (BAS) that directs operations of a plurality of HVAC components; receiving, by one or more configured computing systems of an energy optimization portal (EOP), from the EOCE computing system: a first data set identifying the plurality of HVAC components; a second data set including operational control parameters for each of the plurality of HVAC components; and a third data set including measured operations data associated with each of the plurality of HVAC components; generating by the one or more configured computing systems of the EOP an energy optimized operating control platform based on the first, second, and third data sets, the energy optimized operating control platform arranged to cooperatively control each of the plurality of HVAC components via directives passed from the EOCE computing system to the BAS; and communicating the energy optimized operating control platform from the one or more configured computing systems of the EOP to the EOCE computing system. One or more configured computing systems of the EOP, may automatically populating a website, the website arranged to interactively deliver information associated with the EOCE computing system. The information associated with the EOCE computing system may include site calculation definitions and site alarm definitions.

Generating the energy optimized operating control platform may be further based on default baseline data.

Generating the energy optimized operating control platform may be further based on site data collected over a plurality of weeks. The energy optimized operating control platform may include a cloud driver arranged to communicate with the website arranged to interactively deliver information associated with the EOCE computing system. The energy optimized operating control platform may include a supervisor module coupled to the cloud driver, the supervisor module arranged to communicate operational data and control data associated with the EOCE computing system to the one or more configured computing systems of the EOP via the cloud driver. The operational data may include at least one of site data, alarm data, and audit log data, and the control data may include at least one of weather data and site security data. Both the standard operating control platform in the energy optimization control engine (EOCE) computing system and the energy optimized operating control platform may include an interactive configuration wizard arranged to facilitate configuration of the EOCE computing system. One or more configured computing systems of the EOP, may automatically generating a points list, the points list including programmable parameter data for at least some of the plurality of HVAC components; and via the interactive configuration wizard, the BAS may be configured according to the points list.

A non-transitory computer-readable storage medium having stored contents that configure one or more computing systems of an HVAC provisioning service to perform a method may be summarized as including operating one or more configured computing systems of an energy optimization portal (EOP); receiving at the one or more configured computing systems of the EOP customer data associate with at least one site, the at least one site having at least one commercial building, the at least one commercial building having a building automation system (BAS) that directs operations of a plurality of HVAC components; receiving at the one or more configured computing systems of the EOP from an energy optimization control engine (EOCE) computing system: a first data set identifying the plurality of HVAC components; a second data set including operational control parameters for each of the plurality of HVAC components; and a third data set including measured operations data associated with each of the plurality of HVAC components; generating by the one or more configured computing systems of the EOP an energy optimized operating control platform based on the first, second, and third data sets, an energy optimized operating control platform arranged to cooperatively control each of the plurality of HVAC components via directives passed from the EOCE computing system to the BAS; generating by the one or more configured computing systems of the EOP a points list, the points list including programmable parameter data for at least some of the plurality of HVAC components; generating by the one or more configured computing systems of the EOP a work list, the work list including directives that guide an interactive configuration wizard executing on the EOCE computing system; and communicating the energy optimized operating control platform, the points list, and the work list from the one or more configured computing systems of the EOP to the EOCE computing system.

The method may further include populating a website; logically coupling the website to the at least one site; and via the website, interactively communicating with the EOCE computing system.

The method may further include presenting energy optimization information to a remote computing device via the website, the energy optimization information based on data communicated from the EOCE computing system. The data communicated from the EOCE computing system may include at least one of site data, alarm data, and audit log data. The energy optimized operating control platform communicated from the one or more configured computing systems of the EOP to the EOCE computing system may automatically replace a previous operating control platform operating on the EOCE computing system.

An energy optimization control engine (EOCE) computing system may be summarized as including one or more processors; and at least one non-transitory memory, the non-transitory memory storing instructions that, upon execution by at least one of the one or more processors, cause the system to: execute a first operating control platform, the first operating control platform arranged to: store a first data set identifying a plurality of HVAC components, the plurality of HVAC components coupled to a building automation system (BAS) that directs operations of the plurality of HVAC components; store a second data set including operational control parameters for each of the plurality of HVAC components; store a third data set including operations data associated with each of the plurality of HVAC components, the operations data measured by the BAS; and communicate the first, second, and third data sets via a cloud driver of the first operating control platform to an energy optimization portal (EOP) computing system; receive a second operating control platform via the cloud driver of the first operating control platform, the second operating control platform being an energy optimized operating control platform generated by the EOP computing system; replace the first operating control platform with the second operating control platform; and execute the second operating control platform.

The instructions stored in the non-transitory memory may, upon execution by at least one of the one or more processors, cause the system to cooperatively control each of the plurality of HVAC components via directives communicated from the EOCE computing system to the BAS. The instructions stored in the non-transitory memory may, upon execution by at least one of the one or more processors, cause the system to via a cloud driver, pass operational data and control data between the EOCE computing system and one or more configured computing systems of an energy optimization portal (EOP).

The instructions stored in the non-transitory memory may, upon execution by at least one of the one or more processors, cause the system to: operate an interactive user interface to facilitate an update of the first operating control platform to the second operating control platform, the interactive user interface arranged to: query a portal website of the one or more configured computing systems of the EOP; present a series of dialog boxes generated by the portal website; accept user input data associated with each of the series of dialog boxes; communicate the user input data to the portal website; receive setup and configuration files of the second operating control platform, the setup and configuration files automatically generated at the one or more configured computing systems of the EOP, the setup and configuration files based on the communicated user input data and customized for the EOCE computing system; install the setup and configuration files in the at least one non-transitory memory; verify proper installation of the setup and configuration files; and activate the second operating control platform.

The instructions stored in the non-transitory memory may, upon execution by at least one of the one or more processors, cause the system to: receive a third operating control platform, the third operating control platform being a further energy optimized operating control platform generated by the EOP computing system; and replace the second operating control platform with the third operating control platform.

The present disclosure describes several tools and methods that advance the HVAC energy optimization field of technology. The innovation described in the present disclosure is new and useful, and the innovation is not well-known, routine, or conventional in the energy optimization industry. The innovation described herein uses some known building blocks combined in new and useful ways along with other structures and limitations to create something more than has heretofore been conventionally known. The embodiments improve on HVAC operational computing systems, which, when un-programmed or differently programmed, cannot perform or provide the specific HVAC energy optimization development and deployment features claimed herein.

The embodiments described in the present disclosure improve upon known HVAC energy optimization processes and techniques.

The computerized acts described in the embodiments herein are not purely conventional and are not well understood. Instead, the acts are new to the industry. Furthermore, the combination of acts as described in conjunction with the present embodiments provides new information, motivation, and commercial or other business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts that are substantially more than previously known.

The embodiments described herein use computerized technology to improve the technology of HVAC energy optimization, but other techniques and tools remain available to deploy HVAC optimization programming. Therefore, the claimed subject matter does not foreclose the whole or even substantial HVAC optimization programming technological area.

These features with other objects and advantages which will become subsequently apparent reside in the details of construction and operation as more fully described hereafter and claimed, reference being had to the accompanying drawings forming a part hereof.

This Brief Summary is provided to introduce certain concepts in a simplified form that are further described in the Detailed Description. Except where otherwise expressly stated, if at all, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
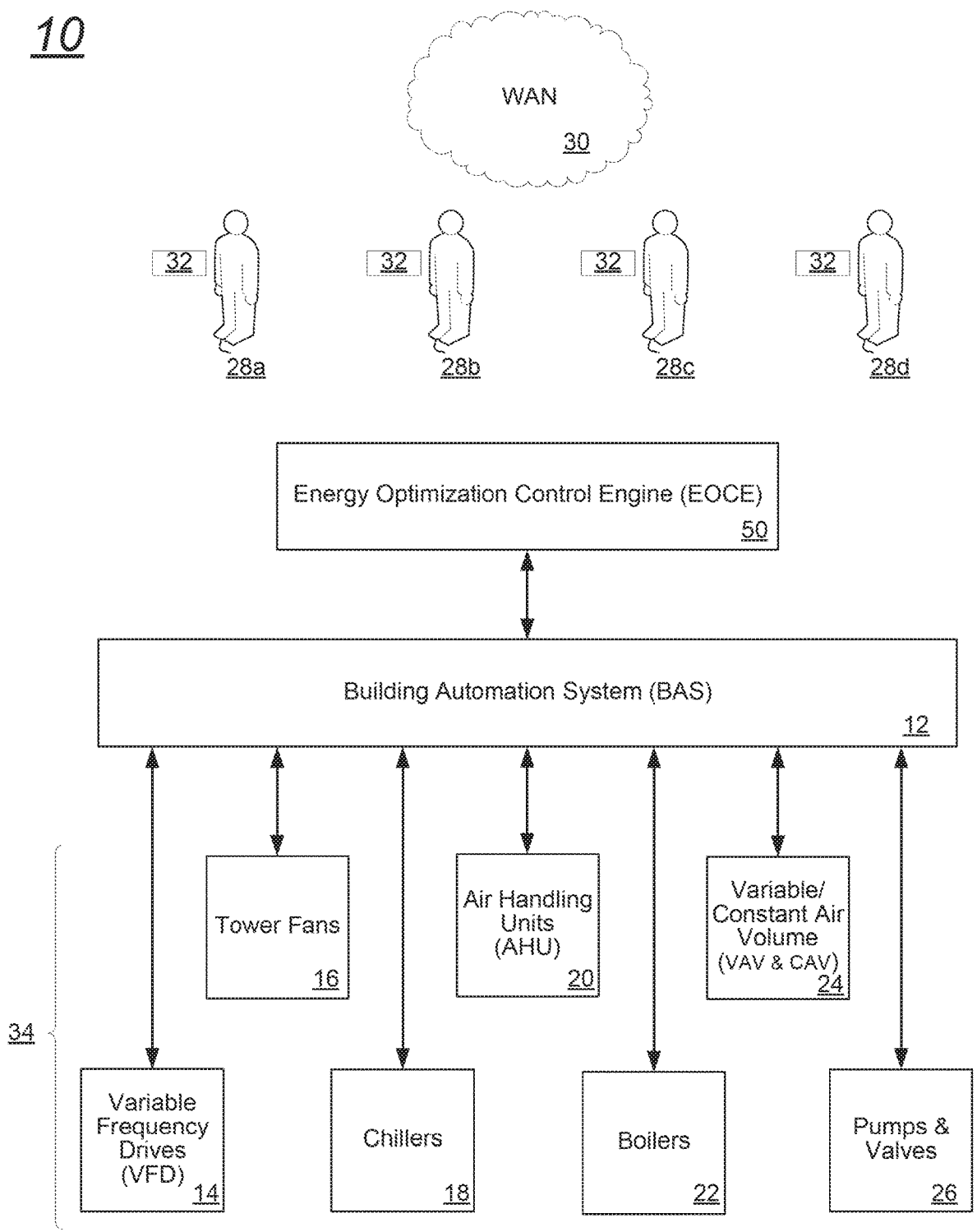
FIG. 1 is a conventional energy optimization HVAC system.

Embodiments of the present invention are directed toward improvements in the structures and methods of energy optimization computing devices deployed in heating ventilation and air conditioning (HVAC) systems of campuses having one or more buildings. In an exemplary embodiment, set forth in a non-limiting descriptive way merely to demonstrate one embodiment, HVAC energy optimization programming logic is automatically created, downloaded, activated, and deployed.

The exemplary embodiment is in contrast to conventional energy optimization systems that direct the operations of HVAC infrastructure. In these conventional systems, one or more on-site engineers are needed to perform custom setup of software and lengthy custom programming onsite. The onsite controls engineer installs, configures, sets up, and programs one or more HVAC controllers, optimization appliances, and other associated computing devices. These conventional tasks are performed at the direction and in cooperation with an energy optimization engineer who may be remote or temporarily at the site of the HVAC components. In contrast to the conventional systems, exemplary embodiments of the present invention provide for the creation, installation, programming, and configuration of energy optimization equipment via a portal web site administered by a remotely located energy optimization entity. In some cases, one or more of the creation, installation, programming, and configuration tasks are performed at the direction or under the supervision of a remote energy optimization engineer. In other cases, one or more of the creation, installation, programming, and configuration tasks are performed automatically. In still other cases, all of the creation, installation, programming, and configuration tasks are fully automated.

In the exemplary case now introduced, an energy optimization control device is installed in a building location. After installation, the energy optimization control device is powered up and brought "online" through an Internet connection. Once online, the energy optimization control device queries a remote portal web site administered by a provider of energy optimization services. Through an innovative wizard program accessed from the energy optimization control device, a person knowledgeable of the building's HVAC systems follows a sequence of dialog boxes and questions to appropriately configure the energy optimization control device for the building. Remotely, energy optimized programming logic is generated for the specific building and downloaded into the energy optimization control device. Certain setup and configuration software files are installed on the energy optimization control device, and then the energy optimization control device is initialized with the HVAC optimization programming that was remotely generated. After the initialization, the energy optimization control device is ready to be activated for operation.

Activation of the energy optimization control device includes collecting data and passing the data back through the web portal administered by the provider of energy optimization services. The collected data includes information associated with the building, information associated with the HVAC equipment installed in the building, and utility and environmental information from third-party sources. A remote computing system administered by the provider of energy optimization services validates a deployable installation in the energy optimization control device, and the energy optimization control device is instantiated and permitted to operate. Henceforth, the energy optimization control device can continue to provide HVAC operational data to the remote computing system, and when sufficient improvements can be achieved, the remote computing system can generate and automatically download and deploy improved energy optimized programming logic.

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

Prior to setting forth additional details, it may be helpful to an understanding of the present disclosure to first set forth certain terms that are used hereinafter.

HVAC system. An HVAC system, as the term is used herein, is broadly understood as a system in, or otherwise associated with, a structure, such as a building, that performs any one or more of heating, ventilating, and air conditioning. An HVAC system may stand alone, or multiple HVAC systems may cooperate with each other in any beneficial combination. One or more HVAC systems may be deployed in a single structure. Alternatively, one or more HVAC systems may be deployed in a plurality of structures, and in these cases, the structures may be arranged in a single campus, or the structures may be arranged in multiple campuses that are remote from each other. An HVAC system, exemplarily and not exhaustively, may include any one or more of building automation systems (BAS), energy optimization controllers, variable frequency drives (VFD), tower fans, chillers, air handling units (AHU), boilers, variable air volume (VAV) and constant air volume (CAV) air handler units, pumps, valves, humidifiers, dehumidifiers, and possibly other components that provide supporting functions to the HVAC system.

Optimize. The term, "optimize," in all of its grammatical constructs, throughout the present specification and claims, when used in the context of "energy optimization" does not mean "optimum" in the general sense. Energy optimization refers to the control or direction of one or more HVAC components such that an improvement to the HVAC system is achieved. The improvement may be any one or more of: desirably increased heating, ventilation, or air conditioning; desirably decreased heating, ventilation, or air conditioning; reduced energy usage while retaining an acceptable level of HVAC performance; reduced cost of operating the particular HVAC system while retaining an acceptable level of HVAC performance; reduced maintenance of one or more components of the particular HVAC system; increased service life of one or more components of the particular HVAC system, or other like improvements. Energy optimization may occur in steps over time. A single HVAC system may be energy optimized one time, two times, or many times. Energy optimization may be achieved as a result of any number of factors considered independently or comprehensively in directing the operation of the particular HVAC system. Such factors include, exemplarily and not exhaustively, measured or calculated operating efficiency of one or more HVAC components, predicted operating efficiency of one or more HVAC components, time of day, geographic location, current weather, predicted weather, source of energy, cost of energy, and current data from any number of input sensors (e.g., light, temperature, occupancy, ingress/egress sensors, and the like).

The term "building engineer" refers to a person or group of people individually or collectively that are knowledgeable about a particular building and its HVAC infrastructure. The term is used broadly so as to not obscure the innovative contents of the present disclosure. Any one or more of those referred to herein as a building engineer may or may not have an engineering degree, an engineering title, or any such designation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, have not been shown or described in detail to avoid unnecessarily obscuring descriptions of the embodiments.

Figure 2:
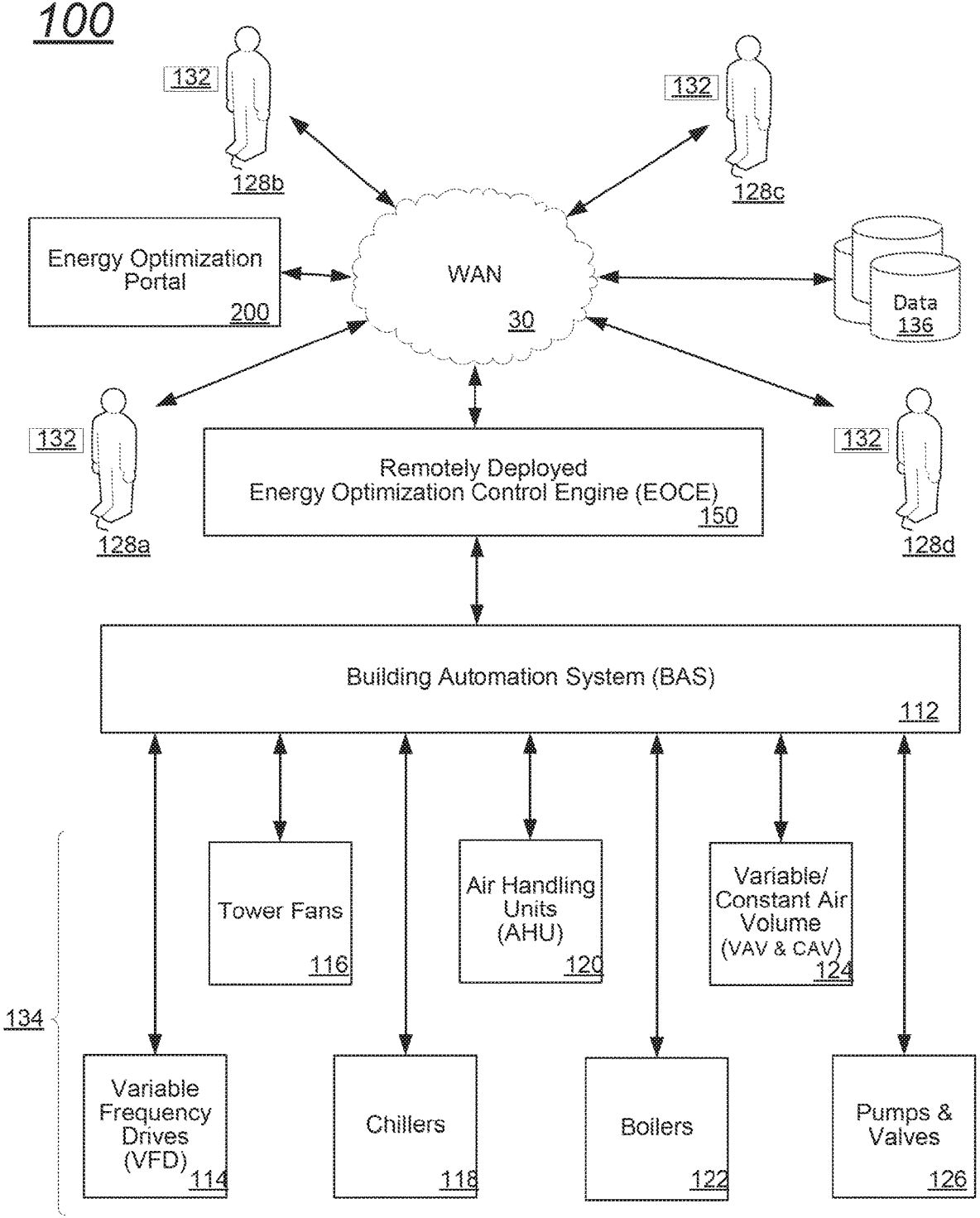
FIG. 2 is an energy optimization HVAC system arranged for remote, automated deployment of HVAC optimization software.

FIG. 2 is an energy optimization HVAC system arranged for remote deployment of HVAC optimization software 100. Some or all parts of the remote deployment may be automated. The remotely deployable system 100 of FIG. 2 includes a building automation system (BAS) 112 that is arranged to control a plurality of HVAC components 134. The BAS 112 in FIG. 2 is arranged in some embodiments to direct the operations of one or more variable frequency drives (VFD) 114, tower fans 116, chillers 118, air handling units (AHU) 120, boilers 122, variable air volume (VAV) and constant air volume (CAV) air handler units 124, pumps and valves 126, and possibly other HVAC components that are not shown.

The BAS 112 is arranged to control the HVAC components 134 of one or more structures, such as a building or a campus of two or more buildings. The structures may be commercial structures such as office buildings, warehouses, buildings of public access (e.g., schools or other government buildings, hospitals, entertainment venues such as stadiums and theaters, banks, retail establishments, dining establishments, hotels or other buildings of accommodation, and the like), industrial buildings, and the like.

In some cases, the BAS 112 performs functions along the lines of the BAS 12 of FIG. 1. As discussed in the present disclosure, however, the BAS 112 of FIG. 2 is structured differently from the BAS 12 of FIG. 1, and the BAS 112 performs different functions or performs functions differently than corresponding functions are performed by the BAS 12.

The HVAC components 134 of FIG. 2 may be along the lines of the HVAC components 34 of FIG. 1. In at least some embodiments, one or more of the HVAC components 134 of FIG. 2 are identical to corresponding HVAC components 34 of FIG. 1. In other embodiments, one or more of the HVAC components 134 of FIG. 2 has features that implement, complement, or otherwise support the functionality of the remotely deployable system 100.

The two-headed pointers in FIG. 2 indicate that the BAS 112 and ones of the plurality of HVAC components 134 may establish and maintain any one or more of unidirectional communications, bidirectional communications, wired communications, wireless communications, electromechanical communications, mechanical communications, or some combination thereof. Using the means of communicating, the BAS 112 is arranged to provide any one or more of control signals, status signals, parameters, and other such data to the HVAC components 134. In some cases, one or more of the HVAC components 134 provides control signals, status signals, error signals, stored parameters, generated data, or other information to the BAS 112. In at least one embodiment, the bidirectional computing means pass a first data set identifying the plurality of HVAC components 134 coupled to the BAS 112, a second data set including operational control parameters for each of the plurality of HVAC components 134, and a third data set including measured operations data associated with each of the plurality of HVAC components 134.

The remotely deployable system 100 includes remotely deployed energy optimization software embodied in an energy optimization control engine (EOCE) 150. The energy optimization software may be otherwise known as an operating control platform that includes particular hardware and software logic. To this end, the operating control platform is provided in an EOCE 150 computing system coupled to the BAS 112.

The remotely deployable EOCE 150 is in bidirectional communication with the BAS 112. Similar to the EOCE 50 of FIG. 1, the remotely deployable EOCE 150 is arranged to provide control information to direct energy efficiency operations of the BAS 112 according to the '814 patent, the '946 patent, the '250 patent, or some other protocol, and the BAS 112 is also arranged to receive status information, error information, measurements, and other operational data from the BAS 112. Different from EOCE 50 of FIG. 1, the EOCE 150 of FIG. 2 has other and different structures and features that improve the computing system operations of the remotely deployable system 100. Considering the various embodiments of the remotely deployable system 100, the improvements include, among other things, faster deployment, more accurate matching of operations parameters of HVAC components 134 to the energy optimization characteristics of the EOCE 150, more frequent redeployment to account for changing conditions internal and external to the energy optimized campus (e.g., HVAC components 134 that are added, replaced, deteriorating, taken out of service, have failed, or the like), remote deployment, automated deployment, and other such improvements.

Implementation of the remotely deployable system 100 has been substantially automated. Deploying the remotely deployable system 100 requires fewer resources than deploying a conventional energy optimization HVAC system 10 (FIG. 1). More specifically, deploying the remotely deployable system 100 reduces reliance on a substantial number of people working as many hours as are necessary to deploy a conventional energy optimization system 10 (FIG. 1).

The remotely deployable EOCE 150 is communicatively coupled through a wide area network (WAN) 30 to any number of computing devices controlled or otherwise associated with any number of people and business entities. The communications may be unidirectional or bidirectional. In some cases, one or more illustrated entities may be embodied in a common entity; in other cases, a single illustrated entity may be embodied in multiple entities cooperating to provide the function or functions described herein.

In FIG. 2, the EOCE 150 is coupled through WAN 30 to a plurality of user computing devices 132, an energy optimization portal (EOP) computing server 200, one or more databases 136, and other computing devices (not shown). The user computing devices 132 are in control of any one or more people including building site owner/managers 128a, energy optimization provider representatives 128b, energy optimization engineers 128c, and others associated with a particular building or building site such as controls engineers, integration engineers, maintenance engineers, service engineers, and the like, which are referred to herein as building engineers 128d.

Via the WAN 30 and an associated user computing device 132, the people associated with the remotely deployable system 100 may communicate with each other and with others. In some cases, certain ones of those associated with the remotely deployable system 100 use a user computing device 132 to communicate with one or more of the EOCE 150, the BAS 112, and the plurality of HVAC components 134.

One operational use of the remotely deployable system 100 is now described. Here, BAS 112 and the plurality of HVAC components 134 are installed in a building complex that may or may not have an EOCE 150. In the case where no EOCE 150 is present, the building site owner/manager 128a may recognize very high energy and maintenance costs in the building complex, and in an effort to reduce the energy and maintenance costs, the building site owner/manager 128a contacts an energy optimization provider representative 128b. The contact with the energy optimization provider representative 128b may be in person using the telephone, or electronically via WAN 30 and the EOP computing server 200.

Via EOP computing server 200, certain data is collected from the BAS 112 and any number of the plurality of HVAC components 134. The collected data may include the location and number of HVAC components 134 that are controlled and managed by the BAS 112, the number of buildings, the geographic location of buildings, energy sources, energy providers, "on" times, "off" times, alerts, temperature data, humidity data, air flow data, and other such information. The particular data/information may be collected instantaneously as a "snapshot," or the information may be collected over hours, days, weeks, or months.

Particular self-generating program software logic is configured within the EOP computing server 200. The self-generating program software logic is designed, written, maintained, or otherwise administered by any number of energy optimization engineers 128c. The self-generating program software logic is arranged as operating control platform generation logic to generate operating control platform software that will execute on EOCE 150 and provide particular functionality through EOCE 150.

Using the collected building complex information provided to the EOP computing server 200, the operating control platform generation logic creates a standard operating control platform configuration of an EOCE 150. In this way, EOCE 150 is customized to the building complex and the installed BAS 112 and HVAC components 134. The customized configuration may include hardware, software, or a combination of logic embodied in hardware and software. In at least some cases, the customized configuration is reviewed and may be desirably adjusted by one or more energy optimization engineers 128c. Once so customized, the EOCE 150 is delivered to the building complex and installed.

The customized installation may be performed by a building engineer 128d, an energy optimization engineer 128c, others, or some combination of these. Once installed, the EOCE 150 will operate well and improve the energy usage of the building complex.

Once deployed, the EOCE 150 communicates, via WAN 30, to the EOP computing server 200. In some embodiments, the EOCE 150 includes particular cloud driver logic and the EOP computing server 200 includes particular energy optimization portal logic to facilitate the communication. In some cases, the information is collected at the building site automatically and provided to the EOP computing server automatically. In these or other cases, a building site owner/manager 128a, an energy optimization provider representative 128b, an energy optimization engineer 128c, a building engineer 128d, or some other party may collect or direct the collection of particular data to be provided to the EOP computing server 200. In these or in other cases, the collection of data may be on a periodic schedule, on changed conditions, on errors or warnings, randomly, or in some other way.

The information collected at the building site and provided to the EOP computing server 200 may include information associated with one or more HVAC components 134 that are added, replaced, deteriorating, taken out of service, have failed, or the like. The information may also be associated with different building conditions such as manually or automatically determined occupancy data, local weather data, different energy optimization models, energy usage or price prediction, and any other such data.

Using the communicated information, an assessment can be made regarding the energy optimization performance of the EOCE 150. The assessment can be made automatically by the EOP computing server 200. In these or in other cases, the assessment may be made or otherwise facilitated by the energy optimization provider representative 128b, the energy optimization engineer 128c, or others. Based on failures, if any, and further based on additional discovered optimizations or for other reasons, it may be determined that improvements can be made to the EOCE 150.

If it is determined that improvements are to be made to the EOCE 150, still more additional building data may be collected, and the operating control platform generation logic 206 (FIGS. 4, 5), in some cases cooperating with a site optimization generator module 514 (FIG. 5), will generate a new energy optimized operating control platform for EOCE 150. The new energy optimized operating control platform configuration may then be automatically delivered to the EOCE 150, and automatically installed by the EOCE 150. The automatic delivery may be facilitated by the energy optimization portal logic of the EOP computing server 200, the cloud driver logic of the EOCE 150, and WAN 30. The automatic installation of the new energy optimized operating control platform configuration may be facilitated by the energy optimization control engine logic that is already onboard the EOCE 150.

Figure 3:
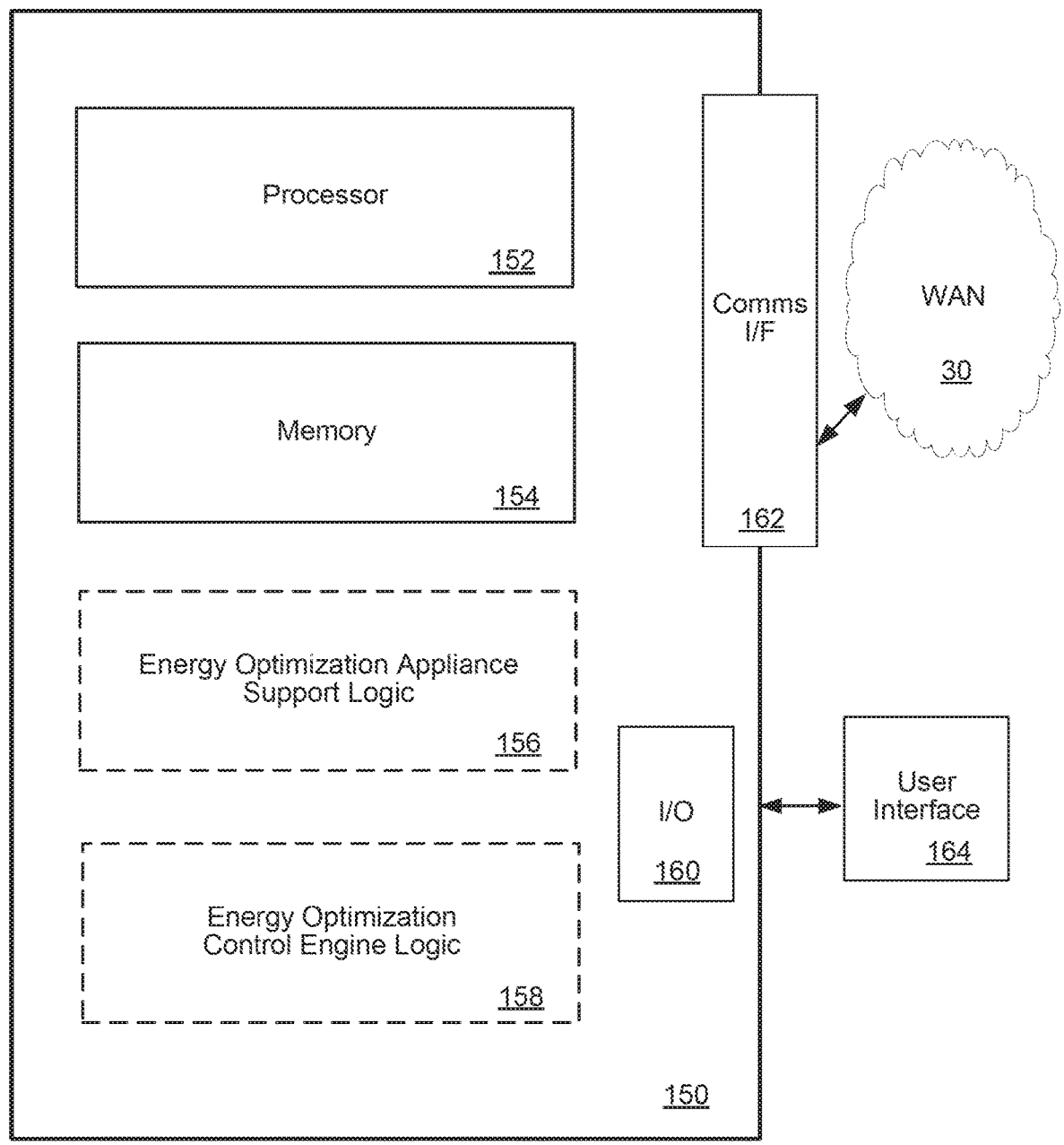
FIG. 3 is a remotely deployable energy optimization control engine embodiment.

FIG. 3 is a remotely deployable energy optimization control engine (EOCE) 150 embodiment. The EOCE 150 in some cases is a single device, and in other cases, the EOCE 150 is embodied as several devices acting in cooperation with each other. The EOCE 150 may be integrated into a building automation system (BAS) 112, or the EOCE 150 may be separate and distinct from a BAS 112 and communicatively coupled to the same. In at least some embodiments, a plurality of remotely deployable EOCE 150 computing devices operate independently from each other, and each of the remotely deployable EOCE 150 computing devices are communicatively coupled to a single energy optimization portal (EOP) computing server 200.

Figure 4:
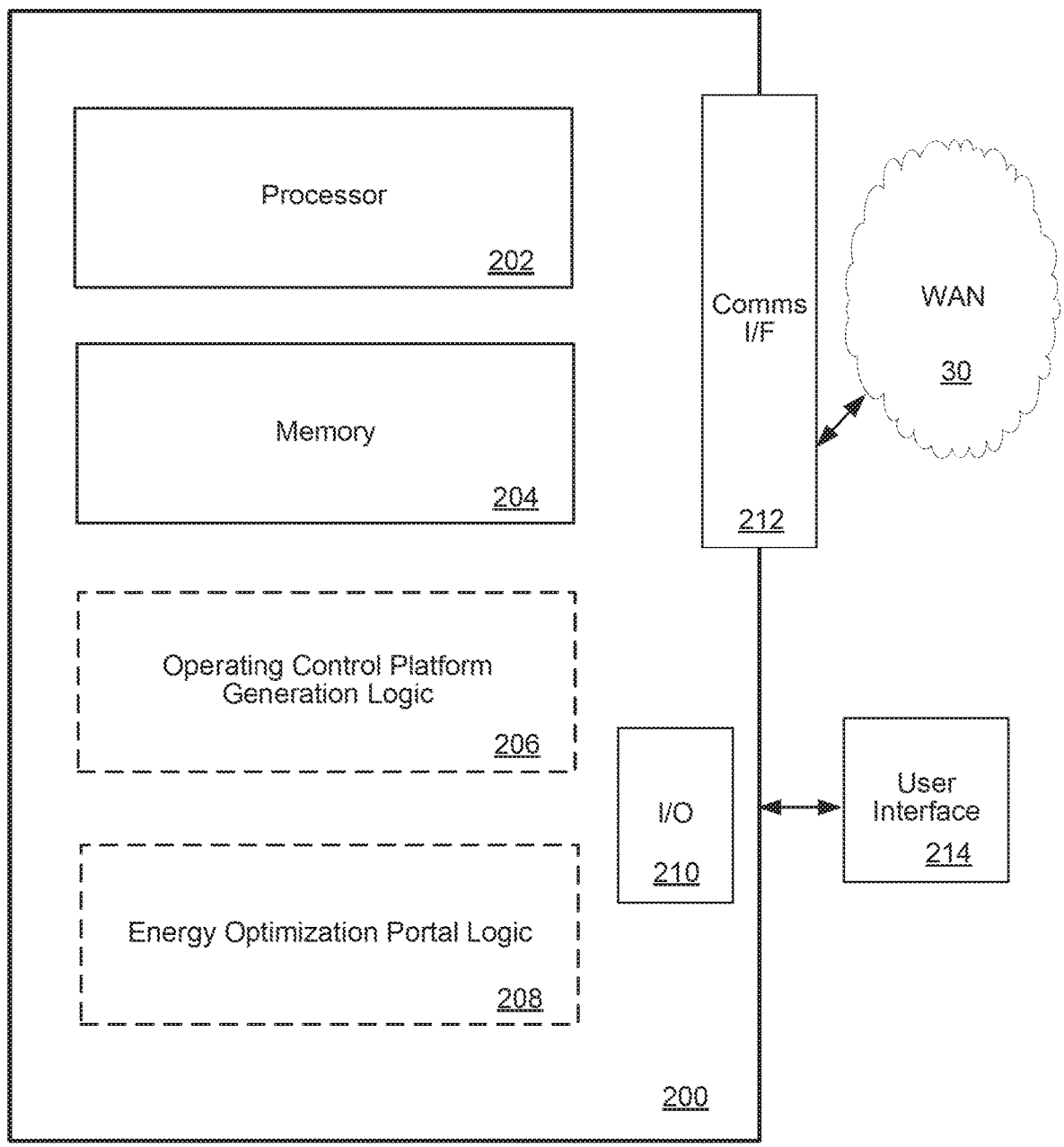
FIG. 4 is an energy optimization portal (EOP) computing server embodiment.

FIG. 4 is an energy optimization portal (EOP) computing server 200 embodiment. In some cases, the EOP computing server 200 is operated by an energy optimization provider. The energy optimization provider may operate a single EOP computing server 200, or the energy optimization provider may operate a plurality of EOP computing servers 200. Each EOP computing server 200 may be in constant, periodic, episodic, manually directed, or some other type of communication with one or more remotely deployable EOCE 150 computing devices.

FIGS. 3 and 4 are computing device embodiments. The computing device in FIG. 3 includes a processor 152, a memory 154, an input/output (I/O) interface 160, a communications interface 162, and a user interface 164. The computing device in FIG. 4 includes a processor 202, a memory 204, an input/output (I/O) interface 210, a communications interface 212, and a user interface 214. The processors, memory, and particular interfaces support the particular features of each computing device as described herein.

Figure 5:
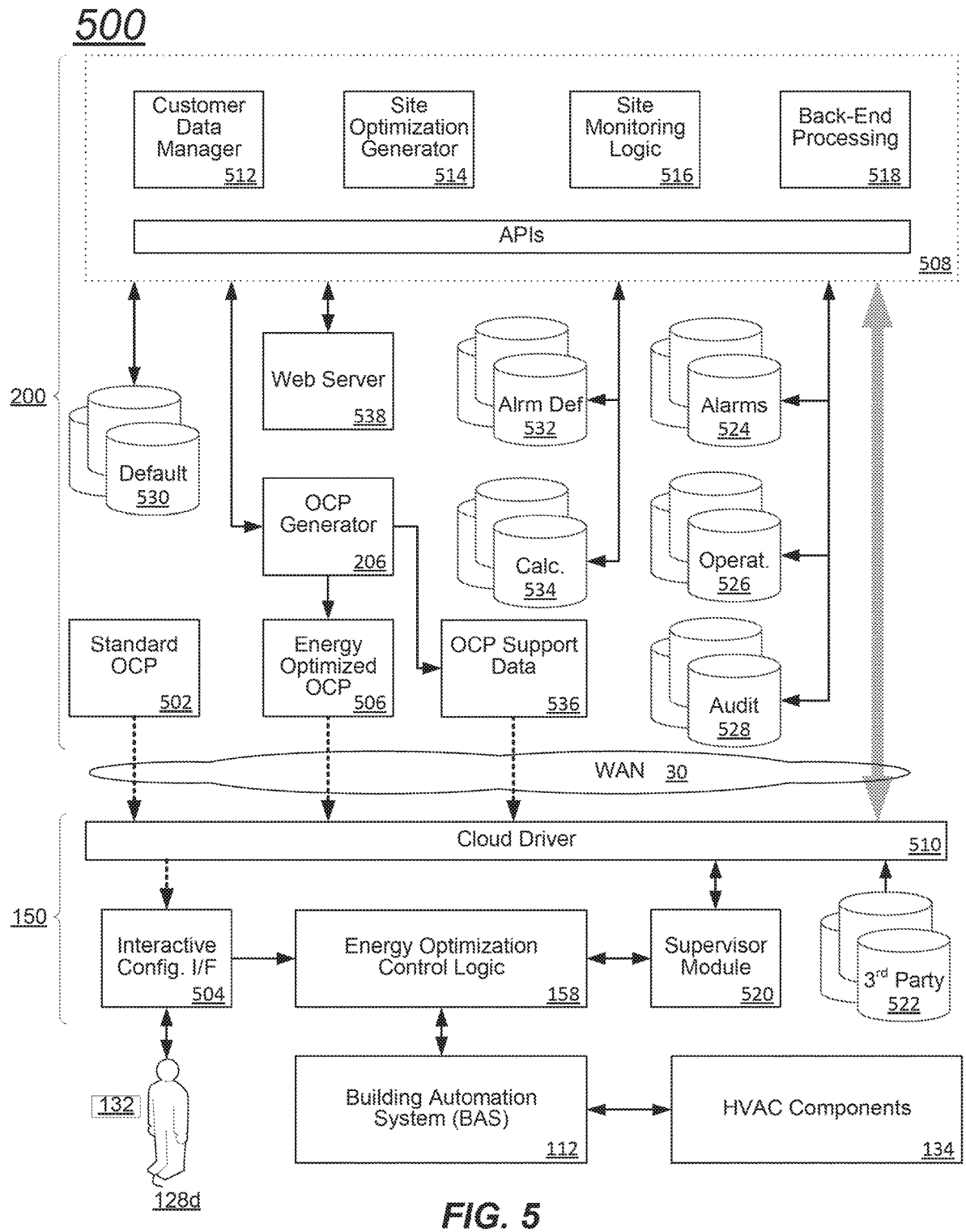
FIG. 5 is a structure and data flow embodiment 500 of a remotely deployed energy optimization system.

In some cases, the computing device embodiments will include optional logic modules. The logic modules may optionally be formed in memory 154, 204 respectively, or the logic modules may be formed separate and distinct from memory 154, 204. For example, when the computing device embodiment is implemented as an EOCE 150, the computing device may include a first energy optimization appliance support logic module 156 and a second energy optimization control engine logic module 158 that are optionally formed in memory 154 or separate and distinct from memory 154. The energy optimization appliance support logic module 156 may include logic for any number of features such as an interactive configuration interface 504 (FIG. 5), a cloud driver module 510 (FIG. 5), and a supervisor module 520 (FIG. 5). Along these lines, when the computing device embodiment is implemented as an EOP computing server 200, the computing device may include a first operating control platform generation logic module 206 and a second energy optimization portal logic module 208 that are optionally formed in memory 204 or separate and distinct from memory 204. These particular logic modules are described in further detail in the discussion associated with FIG. 5.

FIG. 5 is a structure and data flow embodiment 500 of a remotely deployed energy optimization system. In the structure and data flow embodiment 500, various features of a building or building campus are represented along with various features of an EOCE 150 computing device and an EOP computing server 200.

The structures in FIG. 5 represent a computer-implemented method to deploy an HVAC energy optimization program. In the embodiment, a standard operating control platform 502 is provided in an energy optimization control engine (EOCE) 150 computing system. The EOCE 150 computing system is communicatively coupled to a building automation system (BAS) 112 that directs operations of a plurality of HVAC components 134.

The standard operating control platform 502 provides default operating control parameters and other such information to energy optimization control engine logic 158. The standard operating control platform 502 works cooperatively with the energy optimization control logic 158 to provide directives to the BAS 112. The directives are used to control operations of individual ones of the plurality of HVAC components 134.

In some cases, the standard operating control platform 502 is provided as a generic operating control platform that may be used with any EOCE 150 installed in any particular building or campus. In this way, rudimentary energy optimization may be provided with basic data such as time-of-day HVAC operation, temperature setpoints, directives to share heating, cooling, or ventilation loads, or the like, amongst a plurality of HVAC components 134, and the like. Once operating, however, a building engineer 128*d* may supplement the standard operating control platform 502 with additional data specific to the particular installation. Such data may, for example, include a number of chillers and a system-wide unique identifier for each chiller, a number of boilers and a system-wide unique identifier for each boiler, and similar data for any others of a plurality of HVAC components 134 (e.g., pumps, drives, fans, valves, dampers, and the like) that are on site and available for controlled operation. Using the supplemented data, the energy optimization performance of the HVAC system may be improved.

In some embodiments, the standard operating control platform 502 is resident in the EOCE 150 when the EOCE 150 is installed at a building site. In other embodiments, the standard operating control platform 502 is delivered to the EOCE 150 via an interactive configuration interface 504. When the standard operating control platform 502 is communicated from the EOP computing server 200 to the EOCE 150, the communication may be through a cloud driver module 510 of the EOCE 150, or the communication may be directly to the interactive configuration interface 504 using communication means such as a wired or wireless telephone line modem, a mobile memory device (e.g., USB "thumb" drive, smart card, or the like), or the like.

In FIG. 5, the optional direct communication is represented by unidirectional dashed lines and arrows. While it is recognized that such communications may inherently involve bidirectional signaling, acknowledgement controls, and other such two-way administrative functions, data is predominantly passed from the EOP computing server 200 to the EOCE 150 computing device. To facilitate these communications, data may optionally be passed through the cloud driver module 510. Conversely in FIG. 5, indirect communication between the EOCE 150 and the EOP computing server 200 is facilitated by WAN 30, which may in some cases be the Internet. In these cases, the cloud driver module 510 of EOCE 150 is communicatively coupled to the network-enabled interactive platform 508 of EOP computing server 200.

Configuration of the standard operating control platform 502 may include some configuration by a building engineer 128*d*. The building engineer 128*d* may interact directly with the EOCE 150 via a user interface 164 (FIG. 3). In these or alternative embodiments, the building engineer 128*d* may interact with the EOCE 150 via a user computing device 132. For example, in this way, the building engineer 128*d* may gather data at the local site of any particular HVAC component 134 or from some other remote location while in remote communication with the interactive configuration interface 504.

The interactive configuration interface 504 may be arranged in some cases as a wizard that presents dialog boxes, drop down lists, question/answer fields, or some other guided interface. In some cases, at least some portion of the interactive configuration interface 504 is administered via a remote EOP computing server 200. In these cases, the user computing device 132 associated with the building engineer 128*d* is used to access the remote EOP computing server 200 via the wide area network (WAN) 30, and the EOP computing server 200 is in cooperative network communications with the EOCE 150.

The EOCE 150 computing system in FIG. 5 operates in concert with the energy optimization portal (EOP) computing server 200. The EOP computing server 200 is arranged to generate and deploy an energy optimized operating control platform 506. Prior to generating the energy optimized operating control platform 506, the EOP computing server 200 will receive one or more sets of data from the EOCE 150. In at least one exemplary embodiment, the data received by the EOP computing server 200 from the EOCE 150 includes a first data set identifying the plurality of HVAC components, a second data set including operational control parameters for each of the plurality of HVAC components, and a third data set including measured operations data associated with each of the plurality of HVAC components.

Bidirectional passage of data between the EOCE 150 and the EOP 200 may be facilitated through WAN 30 (FIGS. 1-3). Within the EOP 200, a network-enabled interactive platform 508 such as a website is administered. In cases where the network-enabled interactive platform 508 is administered as a website, the EOP 200 is arranged to automatically populate the website, and in this way, the website is arranged to interactively deliver information associated with the EOCE computing system.

The network-enabled interactive platform 508 is arranged with any number of application programming interfaces (APIs), which in at least some embodiments are included or otherwise facilitated in the energy optimization portal logic 208 (FIG. One or more of the APIs may be exposed publicly such that certain information accessible to the EOP 200 can be retrieved by an outside computing device operating particular software such as a web browser. In other cases, the APIs may be closed such that certain information accessible to the EOP 200 is not available publicly. The closed APIs may be secured with any number of network-based protocols.

Several support modules may be arranged within or cooperative to the network-enabled interactive platform 508.

The support modules may bi-directionally pass data associated with an energy optimization services provider, data associated with one or more building sites with energy optimization appliances (e.g., EOCE 150 computing systems), and data associated with other systems. The modules represented in FIG. 5 include a customer data manager module 512, a site optimization generator module 514, a site monitoring logic module 516, and a back-end processing module 518.

The customer data manager module 512 is arranged to capture, generate, process, or otherwise manage customer data associated with at least one site where HVAC energy optimization equipment is installed or at least prospectively planned for installation. In some cases, the site has at least one commercial building, and the one or more commercial buildings have a building automation system (BAS) 112 that directs operations of a plurality of HVAC components 134. In some cases, a single customer is associated with a plurality of sites. In this case, the customer data manager 512 may operate to consolidate information across any or all sites associated with the particular customer. For example, the consolidated information may include accumulated energy statistics of any single, sub-group, or all of the sites.

The customer data manager 512 is further arranged to generate, maintain, and deliver customer data from a customer data repository such as a database. A single customer entity may be associated with one or more building or structure sites, complexes, campuses, or the like. Information maintained by the customer data manager 512 may be utilized by any number of functions of the EOP computing server 200, the OECE 150 computing system, and other computing devices not shown. For example, in some cases, information from the customer data manager 512 may be shared with third-party energy providers, taxing authorities, and other regulatory agencies to verify or otherwise validate energy-savings.

In at least one embodiment, the customer data manager 512 accepts, creates, or otherwise maintains a customer with a name and a system-wide unique customer identifier. Any buildings, structures, sites, or the like that are associated with the customer are linked via the system-wide unique customer identifier. In some cases, each one or set of buildings, structures, sites, or the like that have an EOCE 150 computing system is also provided with a system-wide unique EOCE identifier, and the particular EOCE identifier is coupled to the system-wide unique customer identifier. The customer data manager 512 may also be arranged to couple each system-wide unique customer identifier and each system-wide unique EOCE identifier with appropriate name information, address information, contact information, and the like. In this way, the customer data manager 512 can manage changes to customer details, requests for grouped or consolidated information, and other such information. Additionally, the customer data manager 512 can deliver such information to authorized parties via a network connection (i.e., communications interface 212, FIG. 4), a local connection (i.e., user interface 214, FIG. 4), or via some other means.

A site optimization generator module 514 is arranged to support information communicated via web server 538. In many cases, the site optimization generator module 514 works in cooperation with the operating control platform generation logic 206. When files for an initial setup of an EOCE 150 computing system are generated, corresponding files are generated so that a dashboard or other web-based portal will accurately represent the site where HVAC energy optimization equipment is installed. For example, in at least some cases, the site optimization generator module 514 generates, updates, and otherwise maintains website information associated with a customer, one or more building sites, one or more EOP 150 computing systems, one or more BAS 112 devices, any number of a plurality of HVAC components 134, energy usage, energy savings, status, alerts, and the like.

A site monitoring logic module 516 is arranged to receive data via WAN 30 from any number of EOP 150 computing systems. The received data may be current data, historic data, control data, status data, alarm data, manually entered data, and other data. Such data may be stored in one or more data repositories of the EOP computing server 200 (e.g., alarms repository 524, operating data repository 526, audit data repository 528, and the like), and such data may be linked via a building site, a customer, a geographic area or location, or in many other ways. In some cases, data processed by the site monitoring logic module 516 is used to populate a dashboard or other web-based portal. In this way, a building site owner/manager 128*a*, an energy optimization provider representative 128*b*, an energy optimization engineer 128*c*, a building engineer 128*d*, or other parties can retrieve current data, historic data, or other data associated with any particular aspect of a particular site where HVAC energy optimization equipment is installed.

A back-end processing module 518 is arranged to provide computing server support for the EOP computing server 200. Such functions may include backup, security, print, display, and the like.

Within the EOCE 150, a cloud driver module 510 is administered. The cloud driver module 510 is arranged to communicate with the network-enabled interactive platform 508 (e.g., the website) to interactively deliver information associated with the EOCE 150 computing system. In some cases, the cloud driver module is configured with predetermined identifiers and credentials to automatically perform and authenticate communications with the EOP computing server 200 via the network-enabled interactive platform 508. The operations of the cloud driver module 510 may be arranged to communicate over the Internet or some other communication means of WAN 30.

The cloud driver module 510 is coupled to the energy optimization control logic 158 through a supervisor module 520 of the EOCE 150 computing device. The supervisor module 520 is arranged to communicate operational data and control data associated with the EOCE 150 computing system to the one or more configured computing systems of the EOP 200 via the cloud driver 510. In some cases, for example, the supervisor module 520 retrieves identifying data, operational control parameters, and measured operations data associated with each of the plurality of HVAC components 134. In these or in other cases, the supervisor module 520 retrieves alarm data, audit log data, weather data, site security data, and other kinds of data. Such data may be retrieved from an internal or an external source such as a third-party database 522. Some or all of the data may be collected instantaneously as a "snapshot." Some or all of the data may be collected over a period of time (e.g., minutes, hours, days, weeks, or some other time period). In some cases, the collection of operational data and control data is based on user input, for example, from a building engineer 128*d*.

After the operational data and control data is collected by the supervisor module 520 and passed through the cloud driver 510 to the EOP computing server 200, the data is stored for use later when an energy optimized operating control platform 506 is generated. For example, the alarm data generated in any the plurality of HVAC components 134 or in the BAS 112 can be stored in some embodiments in an alarms repository 524 of the EOP computing server 200. The operational data associated with any of the plurality of HVAC components 134 and the BAS 112 can be stored in some embodiments in an operating data repository 526 of the EOP computing server 200; and the audit log data can be stored in some embodiments in an audit data repository 528 of the EOP computing server 200.

The site optimization generator module 514 works cooperatively with the operating control platform generator 206 to produce energy optimized operating control platforms 506. A standard operating control platform 502 and in some cases and energy optimized operating control platform 506 is derived from baseline energy optimization data. The baseline energy optimization data is stored in a default energy optimization data repository 530, which may be comprised of locally stored data, remotely stored data, manually entered data, or some combination thereof. Data stored in the default energy optimization data repository 530 is derived by an energy optimization engineer or another like entity. The data may include template data, standard points data, HVAC equipment data, default energy calculations, alarm data, rules data, and other such information.

In addition to default data from a default energy optimization data repository 530, an operating control platform may be generated using customer data from a customer data manager 512, site alarm definition data 532, and site calculations definition data 534. Site alarm definition data 532 and site calculations definition data 534 is expressly tied to the specific BAS 112 and plurality of HVAC components 134. Alarms may be set, predicted, detected, or otherwise applied in the operating control platform based on actual data provided by EOCE 150, customer data entered via the customer data manager 512, third-party data (not shown), or data provided from some other source.

An operating control platform generated by the EOP computing server 200 may optionally include an updated version of the interactive configuration interface 504. In these or other cases, the generated operating control platform may include an updated energy optimization control logic module 158. In such cases, the supervisor module 520 may be operated to validate an optional module, and if so validated, the supervisor module 520 may be operated to remove an earlier version of the optional module and install the updated version. Along these lines, in some cases, an operating control platform generated by the EOP computing server 200 may optionally include an updated version of the supervisor module 520. In these cases, the interactive configuration interface 504 may be used to validate and replace an existing supervisor module 520 with an updated supervisor module 520. Accordingly, by incorporating certain redundant functions in executive modules of the EOCE 150 in some embodiments, each and every bit of software in the EOCE 150 may be updated automatically from a remote source with little or no onsite intervention.

In some cases, a software mechanism (e.g., a "wizard"), a hardware mechanism (e.g., a visual or audio indicator), or a combined hardware/software mechanism (e.g., a user interface such as a touchscreen) is employed to assist in updating some or all of the operating control platform. In these cases, a building site may be taken out of energy optimization operations while an update is performed to avoid crashing HVAC operations in case an unanticipated error occurs in association with the update. Accordingly, an onsite user may facilitate the update using the software, hardware, or combined hardware/software mechanism. In other cases, for example, if an update is deemed extremely critical or otherwise necessary for safety, the update is capable of being performed without any onsite user intervention.

Site alarm definition data 532 represents a data repository that stores data used to create action points for one or more calculations, directives, or other operations associated with a building site where HVAC energy optimization equipment is installed. Alarm definition data may include, for example, a plurality of temperature data entries associated with any number of HVAC components manufactured by any number of HVAC component manufacturers, humidity entries, air flow entries, liquid flow entries, time between service events, occupancy metrics, and any other such data.

Site calculations definition data 534 represents a data repository that stores data used associated with energy optimization calculations. The site calculations definition data 534 repository may store calculations, algorithms, functions, formulae, constant data, variable data, data associated with any number of HVAC components manufactured by any number of HVAC component manufacturers, and the like. Exemplary and non-limiting calculations definition data includes formulae to calculate minimum airflow in occupied zones, airflow setpoints, chiller head pressure parameters, refrigerant pressure parameters, chiller shedding threshold parameters, motor speed, real-time equipment efficiencies, accumulated time equipment efficiencies, simulated operating efficiencies, and many other energy optimization related and supporting formulae.

In some cases, an energy optimized operating control platform 506 is generated based on a plurality of data sets such as a first data set identifying a plurality of HVAC components, a second data set including operational control parameters for each of the plurality of HVAC components, and a third data set including measured operations data associated with each of the plurality of HVAC components.

To support the energy optimized operating control platform 506 that is generated by the operating control platform generator 206, the operating control platform generator 206 will also generate data that supports the installation and operation of the energy optimized operating control platform 506 on the EOCE 150. In some cases, the energy optimized operating control platform support data 536 generated by operating control platform generator 206 includes a points list and a work list. In some cases, other support data includes a dashboard configuration for website-based delivery of information. In still other cases, different support data, additional support data, or different and additional support data is provided.

The points list in some embodiments includes programmable parameter data to configure the BAS 112, to configure at least some of the plurality of HVAC components 134, or to configure both the BAS 112 and at least some of the plurality of HVAC components 134. In some cases, the points list provides directives that cooperate with the interactive configuration interface 504. For example, when the interactive configuration interface 504 is arranged along the lines of a "wizard," the points list may provide responses to inquiries made by the wizard. In this way, loading of the energy optimized operating control platform 506 can be fully automated.

In exemplary embodiments, one or more of the points list, the work list, and other files are arranged as spreadsheet documents, database documents, text documents, or the like (e.g., MICROSOFT EXCEL, MICROSOFT WORD, extensible markup language (i.e., XML), structured query language (SQL), portable document format (PDF), clear text).

Such documents may also include site configuration files, which may include station generation documents, dashboard generation documents, and other types of documents.

In at least one exemplary embodiment, a plurality of files (e.g., four files) are used to generate the energy optimization control engine logic 158. In the some cases of the exemplary embodiment, each of the plurality of files has a secondary hash file used by the interactive configuration interface (e.g., wizard) or other modules of the EOCE 150 to identify if there is an updated energy optimized operating control platform 506 or energy optimized operating control platform support data 536 to be downloaded.

Considering the plurality of files in the exemplary embodiment, a first file is a station default parameters configuration file. Such a file is generated from a master copy retained within the default energy optimization data repository 530. The file may be versioned, controlled, and updated periodically or as needed to resolve or fix issues. The station default parameters configuration file typically includes algorithms, calculation, methods, and other logic applied in energy optimization control engine logic 158 and manifested as directives to BAS 112 to run one or more of the HVAC components 134 more efficiently.

Further considering the plurality of files in the exemplary embodiment, a second file is a station portal parameters file. The station portal parameters file includes information collected in the EOP computing server 200 about the associated site where HVAC energy optimization equipment is installed. The station portal parameters file may provide information to modules of the EOP computing server 200, the OECE 150, or both the EOP computing server 200 and the OECE 150 computing system. In a non-limiting embodiment, the station portal parameters file contains specific details regarding optimization parameters, plant size, equipment curves, equation parameters, and the like.

Still considering the plurality of files in the exemplary embodiment, a third file is a station points configuration file, which may also be called the "points list." The station points configuration file in the exemplary embodiment is generated in the EOP computing server 200 from the data gathered in the EOCE 150 computing system. The station points configuration file is specific for each site where HVAC energy optimization equipment is installed, and it is used to build the list of data points communicated between the energy optimization control engine logic 158 and the BAS 112. Certain non-limiting examples of communication points include two-part "Integration Points."

Further considering the station points configuration file of the exemplary embodiment now under discussion, there are two parts to the Integration Points. A first part includes "BAS Points," and a second part includes "Optimization Points."

BAS points are automatically generated based on equipment information provided in the EOP computing server 200. These points include general system data points that may or may not be directly associated with a specific one of the plurality of HVAC components 134. In at least one case, typical BAS points include any one or more of outside air temperature, outside air humidity, chilled water supply temperature, chilled water return temperature, condenser water supply temperature, and condenser water return temperature. Further considering the BAS points, in at least one case, a site where HVAC energy optimization equipment is installed includes in the plurality of HVAC components 134 chillers, cooling towers, condenser water pumps, primary chilled water pumps, secondary chilled water pumps, and heat exchangers. In addition to the points for the individual pieces of equipment, standard BAS system points and BAS determined points are generated, and these points include equipment feedback and status from the BAS 112. Such points for certain ones of the plurality of HVAC components 134 may include status, command, VFD speed output, instantaneous power usage (e.g., as measured in kilowatts), and alarm status.

Optimization points store values calculated by the energy optimization control engine logic 158 on the OECE 150 computing system that is running the algorithms, calculation, methods, and other such logic applied to the data received from the site. Non-limiting examples of optimization points include calculated maximum cooling tower fan speed (CTFANSPDMAX), calculated condenser water supply temperature setpoint (CDWSTSP), chilled water system end of line DP setpoint (CHWSDSP), calculated chilled water temperature setpoint (CHWSTSP), calculated primary chilled water pump speed (PCHWPSPD), and a BAS 112 watchdog (OEWATCHDOG).

And further still considering the plurality of files in the exemplary embodiment, a fourth file is a dashboard configuration file. The dashboard configuration file is arranged to deliver information via web server 538 through the network-enabled interactive platform 508. In some cases, the information includes a "plant overview," which provides a framework for viewing site information where HVAC energy optimization equipment is installed. In some cases, the information includes optimization compliance data, which may be configured for viewing real-time energy optimization data for the site. In some cases, graphing logic is provided to deliver (e.g., via WAN 30 configured as the Internet) calculated or aggregated values from formulas applied to data that comes in from the EOCE 150 computing system. In still other cases, the information includes user interface metadata that enables efficient and appealing of multimedia data.

Once so generated, the energy optimized operating control platform 506 and energy optimized operating control platform support data 536 is communicated from the EOP computing system 200 to the EOCE 150 computing device. Dashboard support data may also be communicated or otherwise made available to web server 538 and one or more modules of the network-enabled interactive platform 508. The communication of the energy optimized operating control platform 506 and operating control platform support data 536 may be a direct communication from the operating control platform generator 206 to the EOCE 150, optionally using one or more of cloud driver 510 and interactive configuration interface 504. Alternatively the energy optimized operating control platform 506 and operating control platform support data 536 may be indirectly communicated to EOCE 150 via the network enabled platform 508 of EOP 200, WAN 30, and cloud driver 510. Other methods of communication are also considered.

The energy optimized operating control platform 506 is arranged to cooperatively control each of the plurality of HVAC components 134 via directives passed from the EOCE 150 computing device to the BAS 112. In some cases, controlling each of the plurality of HVAC components 134 may include directives that individually address and control one or more individual HVAC components (e.g., chiller commands, boiler commands, fan commands, air handling unit commands, and the like). In these cases, or in alternative cases, controlling each of the plurality of HVAC components 134 may include directives that direct operations of the entire HVAC system (e.g., shutdown, power cycle, clear history, and the like).

In another non-limiting exemplary embodiment, automatic configuration of an OECE 150 computing system may begin when a building engineer 128d connects a user computing device 132 to an interactive configuration interface 504, which may be arranged as a web-based wizard or other such interface. The logic necessary to permit such functionality is preloaded on the OECE 150 computing system prior to shipment. The building engineer 128d will have default credentials locally, which are authenticated in the OECE 150 computing system locally or via the cloud driver 510 and WAN 30. Based on information passed from the OECE 150 computing system to the EOP computing server 200, energy optimized operating control platform 506 logic and energy optimized operating control platform support data 536 are generated by operating control platform generation logic 206. In this exemplary embodiment, the energy optimized operating control platform 506 logic has a plurality of portions that work cooperatively together. A first portion may include an updated interactive configuration interface 504, and a second portion may include the energy optimization control engine logic 158. Once loaded on the OECE 150 computing system, the building engineer 128d may pass data (e.g., commands) through the user computing device 132 to the configure and deploy the updated OECE 150 computing system.

Yet one more exemplary embodiment is described to illustrate structures and methods to update the energy optimization control engine logic 158. Considering a site where HVAC energy optimization equipment is installed, at some point after initial installation or after a previous update, additional changes may be made to the site such as by adding or changing any one or more of the plurality of HVAC components 134. In these cases, one way the need or desire for an update can be detected is by comparing a datum (e.g., an MD5 hash, a checksum, a file list, a time or date stamp, or some other datum) to a representative value. The representative value may be a threshold, a previously recorded value, a generated value, a time stamp, a date stamp, or some other representative value. Another way that the need or a desire for an update can be detected is based on a recognition at the EOP computing server 200 that additional data, missing data, or different data is being passed from the EOCE 150 computing device. In still other cases, when a piece of equipment is added or changed (e.g., a pump, a cooling tower, a chiller or sensor), a building engineer 128d may input information about the change (e.g., equipment size, equipment ID, ratings such as kilowatts, air or liquid flow rates, and the like) via a user computing device 132 and the interactive configuration interface 504. These or other techniques may be employed to identify where changes are made to core files rather than simply generated data files. If, for example, a test or threshold datum stored on the EOP computing system 200 is different from a corresponding datum stored or produced by the EOCE 150 computing system, then an update can be queued. In some cases, queuing the update includes alerts or other indication information passed via the interactive configuration interface 504.

Once the need or desire for a first or additional update is determined, files may be automatically, semi-automatically, or manually generated by the operating control platform generation logic 206 and site optimization generator 514 of the EOP computing server 200. Flags, alerts, or other such trigger information may be set or otherwise scheduled to cause the EOCE 150 computing system to begin the update process as described herein. The update process may include generation or re-generation of the datum information that is used to determine when future energy optimization updates are needed or desired. The update process may be performed with or without onsite observation, user intervention, user direction, or with or without other user actions.

The site monitoring logic module 516 works cooperatively with a web server module 538 of the EOP computing server 200. The web server module may be configured to serve one or more static and interactive pages of a website arranged to communicate information associated with the EOCE 150 computing device. In some cases, information populated on the website is drawn from information associated with the EOCE 150. For example, site alarm definition data 532 and site calculations definition data 534 may be delivered via the web server 538. In these cases, and in other cases, the site monitoring logic module 516 may be used to collect current data, historic data, control data, status data, alarm data, manually entered data, and other data from the EOCE 150. Such data may be stored in one or more data repositories of the EOP computing server 200 (e.g., alarms repository 524, operating data repository 526, audit data repository 528, and the like). Alternatively, or in other such cases, transitory data may be captured, communicated via the web server 538, and disposed of.

The web server 538 in some embodiments communicates with an EOCE 150 computing system. Alternatively, or in addition, web server 538 may in some embodiments communicate with other computing devices via WAN 30 (e.g., the Internet). Communication with other computing devices may include one first level of information communicated to unknown or unauthorized devices and one second level of information communicated to known or authorized devices. In these cases, the second level of information may include all of the information included in the first level and additional information (e.g., private information, financial information, secure information, and the like) that is not available to unknown and unauthorized parties. Information communicated through web server 538 may be facilitated or otherwise organized according to one or both of a system-wide unique customer identifier and a system-wide unique EOCE identifier maintained by the customer data manager 512.

In some cases, web server 538 administers a web dashboard. The web dashboard may provide the first level of information discussed herein to all parties, which may include unknown or unauthorized parties. For example, in some cases, the first level of information may include building address information, energy optimization service provider information, marketing material, or other content such as multimedia content. In some cases, the first level of information may exclude any data associated with any particular EOP computing server 200 or any particular EOCE 150 computing system. The web dashboard may also provide the second level of information to customers or their authorized representatives. In at least some of these cases, the second level of information may include some information associated with a particular EOP computing server 200 and information associated with one or more EOCE 150 computing systems. The second level of information may include a user interface. The user interface may be arranged to deliver EOCE 150 operation information, BAS 112 operation information, information associated with operations of a plurality of HVAC components 134, reporting of energy consumption, reporting of optimization, reporting of energy savings, HVAC or other alerts, status codes, and the like. The second level of information may be delivered based on authorization of a particular system-wide unique customer identifier or authorization of a particular system-wide unique EOCE identifier.

In still other cases, the web dashboard administered by the web server 538 may also provide a third level of information. The third level of information may include all of the information of the first level and second level. The third level of information may include information from any one or more EOP computing servers 200 and any one or more EOCE 150 computing systems across a plurality of system-wide unique customer identifiers and a plurality of system-wide unique EOCE identifiers. The third level of information may be provided only to authorized energy optimization provider representatives 128*b* (FIG. 2).

Processor-based computing systems of the present disclosure, such as those exemplarily and not exhaustively represented in FIGS. 3 and 4 are, or otherwise include a computing device. One or more of the computing devices may be arranged as a computing server, which is a computing device arranged for particular networked computing operations. The computing devices, when so arranged with particular software logic, hardware logic, or a combination of software and hardware logic are transformed from generic and unspecific general purpose computing devices to specialized combination devices comprising hardware and software configured for a specific and particular purpose. The computing devices discussed in the present disclosure, prior to any express logic being added to implement the transformation into specialized combination devices, may be any one or more of single or networked computing server devices, desktop computers, laptop computers, tablets, smartphones, wearable computing devices, automotive or other vehicle embedded computing devices, or any other type of fixed or mobile computing device.

The computing devices discussed herein and represented by computing device embodiments of FIGS. 3 and 4 may include operative hardware found in conventional computing device apparatuses such as one or more processors, volatile and non-volatile transitory and non-transitory memory, serial and parallel input/output (I/O) circuitry compliant with various standards and protocols, wired and/or wireless networking circuitry (e.g., a communications transceiver), one or more user interface (UI) modules, logic, and other electronic circuitry.

In some embodiments, the computing device embodiments may be communicatively coupleable to a database such as database 136 (FIG. 2). The database 136 is illustrated in FIG. 2 as an external database accessible via WAN 30, but in some cases, database 136 may be internal or otherwise directly accessible (e.g., arranged in memory 204 when memory 204 is internal memory). In still other cases, database 136 is a third-party data source, or some other database.

Database 136 may be administered by one or more of the computing device embodiments described herein, which means that data in database 136 may be read, written, and queried or otherwise searched. The computing device embodiments or some other device may also have administrative control over some or all of database 136 so as to create data structures, delete data structures, obfuscate data structures, grant and limit third-party access to data structures, and the like. In cases where database 136 is administered by a computing device embodiment, the database 136 may be administered by one or more of an energy optimization portal (EOP) computing server 200, a remotely deployable energy optimization control engine (EOCE) 150 computing device, or some other administrative device such as computing device controlled by a third party (not shown).

Database structures, such as database 136 (FIG. 2), may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a "cloud" computing system, which would be accessible via wide area network (WAN) 30 or some other network.

Processors 152, 202, as described herein, include central processing units (CPU's), microcontrollers (MCU), digital signal processors (DSP), application specific integrated circuits (ASIC), and the like. A processor 152, 202 interchangeably refers to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory 154, 204 or may be hard-coded as a state machine or set of control signals. According to methods and devices referenced herein, embodiments describe software executable by a processor 152, 202 and operable to execute certain ones of the method acts.

As known by one skilled in the art, each memory 154, 204 described herein may include one or more physical memory devices, and each memory 154, 204 may comprise any combination of volatile and non-volatile computer-readable media for reading, writing, or reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM device, and/or the like. In some cases, a particular memory is separated virtually or physically into separate areas, such as a first memory, a second memory, a third memory, etc. In these cases, it is understood that the different divisions of memory may be in different devices or embodied in a single memory.

The memory 154, 204 in some cases is a non-transitory computer medium configured to store computing (e.g., software) instructions arranged to be executed by a processor 152, 202. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of a computing device embodiment.

The computing devices discussed herein may further include operative software found in conventional computing devices such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, a computing device as discussed in the present disclosure is a single hardware machine having at least some of the hardware and software listed herein, and in other cases, the computing device is a networked collection of hardware and software machines working together in a server farm or "cloud" to execute the functions of one or more embodiments described herein. Some aspects of the conventional hardware and software of the computing devices discussed herein are not shown or described for simplicity.

Input/output (I/O) circuitry 160, 210 and user interface (UI) modules 164, 214 include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like. Buttons, keypads, computer mice, memory cards, serial ports, bio-sensor readers, touch screens, and the like may, individually or in cooperation, be useful to an operator of a computing device embodiment described herein and such devices may be represented in the I/O ports 160, 210 and user interface 164, 214 described herein. The devices may, for example, input control information into the respective computing device. Displays, printers, memory cards, LED indicators, temperature sensors, audio devices (e.g., speakers, piezo device, etc.), vibrators, and the like are all useful to present output information to an operator of the particular computing device embodiment. In some cases, the input and output devices are directly coupled to the particular computing device embodiment and electronically coupled to a processor 152, 202 or other operative circuitry. In other cases, the input and output devices pass information via one or more communication ports 162, 212 (e.g., RS-232, RS-485, infrared, USB, etc.).

In at least one embodiment, the computing devices discussed herein communicate with each other or other computing devices via communication through a communications interface 162, 212 via WAN 30. The communications interface 162, 212 may involve an Internet connection or some other network connection such as a local area network (LAN) interface or wide area network (WAN) interface. Non-limiting examples of structures that enable or form parts of a network and network interface include, but are not limited to, an Ethernet, twisted pair Ethernet, digital subscriber loop (DSL) devices, wireless LAN, WiFi, Worldwide Interoperability for Microwave Access (WiMax), or the like.

Network 30 may be or otherwise include one or more of a wide area network (WAN) such as the Internet, a local area network (LAN), a personal area network (PAN), a peer-to-peer network, or some other type of network. Each of the computing devices described in the present disclosure may involve an Internet connection or some other type of local area network (LAN) or wide area network (WAN) connection coupled to a particular communications interface such as communications interface 162, 212. Non-limiting examples of structures that enable or form parts of a network include, but are not limited to, an Ethernet, twisted pair Ethernet, digital subscriber loop (DSL) devices, wireless LAN, WiFi, Worldwide Interoperability for Microwave Access (WiMax), cellular-infrastructure based devices, and the like.

Certain figures in the present disclosure (e.g., FIGS. 2, 5) include data flow diagrams illustrating non-limiting processes that may be used by embodiments of remotely deployed energy optimization systems. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

Turning to FIG. 5, for example, the structure and data flow embodiment 500 of a remotely deployed energy optimization system is arranged as a machine-learning device to manage, monitor, and automatically deploy HVAC optimization software. As time passes, the EOP computing server 200 continues to collect data, analyze data, analyze results, and improve the individual or combined energy optimization of a plurality of HVAC components 134. In other words, the computational model described herein continuously monitors one or more modules of the EOCE 150 computing system (e.g., the interactive configuration interface 504, the energy optimization control logic 158, the supervisor module 520, the cloud driver 510), and then the computational model analyzes results of the monitoring and performs automatic, semiautomatic, or manual updates. What's more, as time passes, and as the computational model continues to operate, the computational model also continues update itself with new and refined data, and the computational model continues to improve the energy efficiency of the site where HVAC energy optimization equipment is installed.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of seconds or minutes), and that the activity may be performed on an ongoing basis (e.g., receiving data randomly, periodically, scheduled, streaming, or otherwise; the data associated one or more HVAC components, the data received at an EOP computing server 200 from an EOCE 150 computing system). An example of an activity that is not real-time is one that occurs over an extended period of time (e.g., weeks or months).

Where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a substantial amount of offsite software programming and configuration may be described as software programming that takes place by one or more software practitioners over a plurality of days or weeks.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method to deploy a heating ventilation and air conditioning (HVAC) energy optimization program, comprising:
    providing a standard operating control platform in an energy optimization control engine (EOCE) computing system, the EOCE computing system communicatively coupled to a building automation system (BAS) that directs operations of a plurality of HVAC components;
    determining that at least one HVAC component of the plurality of HVAC components has changed; and
    based on the determination that the at least one HVAC component has changed:
        receiving, by one or more configured computing systems of an energy optimization portal (EOP), from the EOCE computing system:
            a first data set identifying the plurality of HVAC components;
            a second data set including operational control parameters for each of the plurality of HVAC components; and
            a third data set including measured operations data associated with each of the plurality of HVAC components;
        generating by the one or more configured computing systems of the EOP an energy optimized operating control platform based on the first, second, and third data sets, wherein instructions specified by the energy optimized operating control platform are used by an EOCE to cooperatively control each of the plurality of HVAC components via directives passed from the EOCE computing system to the BAS, the energy optimized operating control platform including configuration settings for each of the plurality of HVAC components; and
        communicating the energy optimized operating control platform from the one or more configured computing systems of the EOP to the EOCE computing system, wherein the EOCE computing system:
            causes the operation of the plurality of HVAC components to be optimized by automatically installing the configuration settings onto the plurality of HVAC components, the plurality of HVAC components being caused to be operated in accordance with the installed configuration settings; and
            causes the BAS to be optimized by automatically installing the configuration settings onto the BAS, such that operations of the BAS for operating the plurality of HVAC components are able to be overridden by the EOCE computing system.

2. A computer-implemented method to deploy an HVAC energy optimization program according to claim 1, comprising:
    by the one or more configured computing systems of the EOP, automatically populating a website hosted by a computing device, the website being configured to cause the computing device to receive information associated with the EOCE computing system; and
    causing, by the website, the computing device to transmit information associated with the EOCE to a user device.

3. A computer-implemented method to deploy an HVAC energy optimization program according to claim 2, wherein the information associated with the EOCE computing system includes site calculation definitions and site alarm definitions.

4. A computer-implemented method to deploy an HVAC energy optimization program according to claim 2, wherein generating the energy optimized operating control platform is further based on default baseline data.

5. A computer-implemented method to deploy an HVAC energy optimization program according to claim 2, wherein generating the energy optimized operating control platform is further based on site data collected over a plurality of weeks.

6. A computer-implemented method to deploy an HVAC energy optimization program according to claim 2, wherein the EOCE uses instructions included in the energy optimized operating control platform to access the website via a cloud driver.

7. A computer-implemented method to deploy an HVAC energy optimization program according to claim 6, wherein the EOCE uses instructions included in the energy optimized operating control platform, via a supervisor module coupled to the cloud driver, to communicate operational data and control data associated with the EOCE computing system to the one or more configured computing systems of the EOP.

8. A computer-implemented method to deploy an HVAC energy optimization program according to claim 7, wherein the operational data includes at least one of site data, alarm data, and audit log data, and wherein the control data includes at least one of weather data and site security data.

9. A computer-implemented method to deploy an HVAC energy optimization program according to claim 2, wherein the EOCE is configured via an interactive configuration user interface based on the standard operating control platform of the EOCE and the energy optimized control platform.

10. A computer-implemented method to deploy an HVAC energy optimization program according to claim 9, comprising:
by the one or more configured computing systems of the EOP, automatically generating a points list, the points list including programmable parameter data for at least some of the plurality of HVAC components; and
via the interactive configuration user interface, configuring the BAS according to the points list.

11. A non-transitory computer-readable storage medium having stored contents that configure one or more computing systems of an HVAC provisioning service to perform a method, the method comprising:
operating one or more configured computing systems of an energy optimization portal (EOP);
receiving, at the one or more configured computing systems of the EOP, customer data associated with at least one site, the at least one site having at least one commercial building, the at least one commercial building having a building automation system (BAS) that directs operations of a plurality of HVAC components;
receiving at the one or more configured computing systems of the EOP from an energy optimization control engine (EOCE) computing system:
a first data set identifying the plurality of HVAC components;
a second data set including operational control parameters for each of the plurality of HVAC components; and
a third data set including measured operations data associated with each of the plurality of HVAC components;
detecting whether a new HVAC component has been added to the commercial building; and
based on the detection of the new HVAC component:
updating the first data set, second data set, and third data set based on the addition of the HVAC component;
generating by the one or more configured computing systems of the EOP an energy optimized operating control platform based on the first, second, and third data sets, wherein instructions included in the energy optimized operating control platform are used by an EOCE to cooperatively control each of the plurality of HVAC components via directives passed from the EOCE computing system to the BAS, the energy optimized operating control platform including configuration settings for each of the plurality of HVAC components;
generating by the one or more configured computing systems of the EOP a points list, the points list including programmable parameter data for at least some of the plurality of HVAC components;
generating by the one or more configured computing systems of the EOP a work list, the work list including directives that guide an interactive configuration wizard executing on the EOCE computing system; and
communicating the energy optimized operating control platform, the points list, and the work list from the one or more configured computing systems of the EOP to the EOCE computing system, wherein the EOCE computing system:
causes the operation of the plurality of HVAC components to be optimized by automatically installing the configuration settings onto the plurality of HVAC components, the plurality of HVAC components being caused to be operated in accordance with the installed configuration settings; and
causes the BAS to be optimized by automatically installing the configuration settings onto the BAS, such that the operations of the BAS for operating the plurality of HVAC components are able to be overridden by the EOCE computing system.

12. A non-transitory computer-readable storage medium according to claim 11, wherein the method further comprises:
populating a website;
logically coupling the website to the at least one site; and
via the website, interactively communicating with the EOCE computing system.

13. A non-transitory computer-readable storage medium according to claim 12, wherein the method further comprises:
presenting energy optimization information to a remote computing device via the website, the energy optimization information based on data communicated from the EOCE computing system.

14. A non-transitory computer-readable storage medium according to claim 13, wherein the data communicated from the EOCE computing system includes at least one of site data, alarm data, and audit log data.

15. A non-transitory computer-readable storage medium according to claim 11, wherein the energy optimized operating control platform communicated from the one or more configured computing systems of the EOP to the EOCE computing system automatically replaces a previous operating control platform operating on the EOCE computing system.

16. An energy optimization control engine (EOCE) computing system, comprising:
one or more processors; and
at least one non-transitory memory, the non-transitory memory storing instructions that, upon execution by at least one of the one or more processors, cause the EOCE computing system to:
execute instructions included in a first operating control platform, in which executing the instructions included in the first operating control platform causes the EOCE to:
store a first data set identifying a plurality of HVAC components, the plurality of HVAC components being coupled to a building automation system (BAS) that directs operations of the plurality of HVAC components;
store a second data set including operational control parameters for each of the plurality of HVAC components;
store a third data set including operations data associated with each of the plurality of HVAC components, the operations data measured by the BAS; and communicate the first, second, and third data sets via a cloud driver of the first operating control platform to an energy optimization portal (EOP) computing system;
detect a change in the plurality of HVAC components; and
based on the detected change in the plurality of HVAC components:
communicate the change in the plurality of HVAC components to the EOP computing system;
receive a second energy optimized operating control platform via the cloud driver of the first operating control platform, the second energy optimized operating control platform being an energy optimized operating control platform generated by the EOP computing system, the second energy optimized operating control platform including configuration settings for each of the plurality of HVAC components;
replace the first operating control platform with the second operating control platform; and
execute instructions included in the second operating control platform, wherein executing the instructions included in the second operating control platform includes:
causing the operation of the plurality of HVAC components to be optimized by automatically installing the configuration settings onto the plurality of HVAC components, the plurality of HVAC components being caused to be operated in accordance with the installed configuration settings; and
causing the BAS to be optimized by automatically installing the configuration settings onto the BAS, such that the operations of the BAS for operating the plurality of HVAC components are able to be overridden by the EOCE computing system.

17. An EOCE computing system according to claim 16, wherein the instructions stored in the non-transitory memory, upon execution by at least one of the one or more processors, cause the EOCE computing system to:
cooperatively control each of the plurality of HVAC components via directives communicated from the EOCE computing system to the BAS.

18. An EOCE computing system according to claim 16, wherein the instructions stored in the non-transitory memory, upon execution by at least one of the one or more processors, cause the EOCE computing system to:
via a cloud driver, pass operational data and control data between the EOCE computing system and one or more configured computing systems of an energy optimization portal (EOP).

19. An EOCE computing system according to claim 18, wherein the instructions stored in the non-transitory memory, upon execution by at least one of the one or more processors, cause the EOCE computing system to:
operate an interactive user interface to facilitate an update of the first operating control platform to the second operating control platform, in which operation of the interactive user interface includes causing the EOCE computing system to:
query a portal website of the one or more configured computing systems of the EOP;
present a series of dialog boxes generated by the portal website;
accept user input data associated with each of the series of dialog boxes;
communicate the user input data to the portal website;
receive setup and configuration files of the second operating control platform, the setup and configuration files automatically generated at the one or more configured computing systems of the EOP, the setup and configuration files based on the communicated user input data and customized for the EOCE computing system;
install the setup and configuration files in the at least one non-transitory memory;
verify proper installation of the setup and configuration files; and
activate the second operating control platform.

20. An EOCE computing system according to claim 16, wherein the instructions stored in the non-transitory memory, upon execution by at least one of the one or more processors, cause the EOCE computing system to:
receive a third operating control platform, the third operating control platform being a further energy optimized operating control platform generated by the EOP computing system; and
replace the second operating control platform with the third operating control platform.

* * * * *